No. 616,352. Patented Dec. 20, 1898.
F. V. PHILLIPS.
MACHINE FOR CUTTING POCKETS IN WINDOW STILES.
(Application filed Jan. 29, 1895.)
(No Model.) 4 Sheets—Sheet 1.
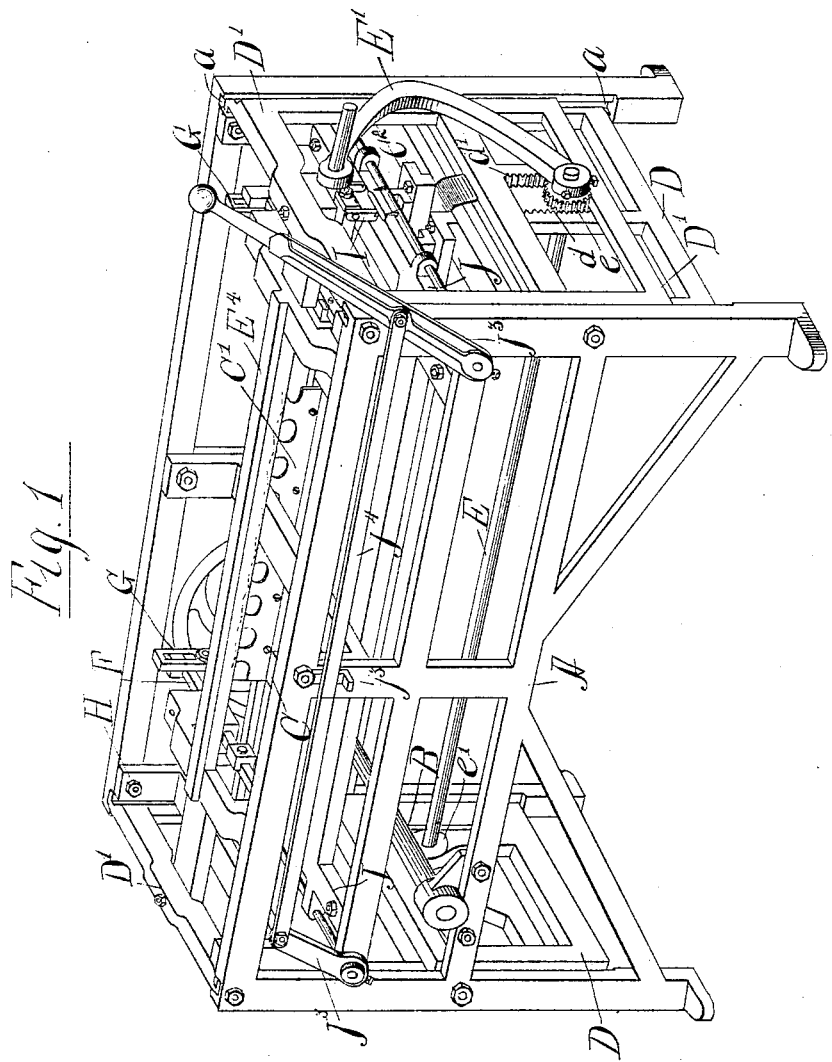
Witnesses
Clinton Hamlink
John W. Adams
Inventor
Francis V. Phillips
by Dayton, Poole & Brown
his Attorneys
THE NORRIS PETERS CO., PHOTO-LITHO., WASHINGTON, D. C.

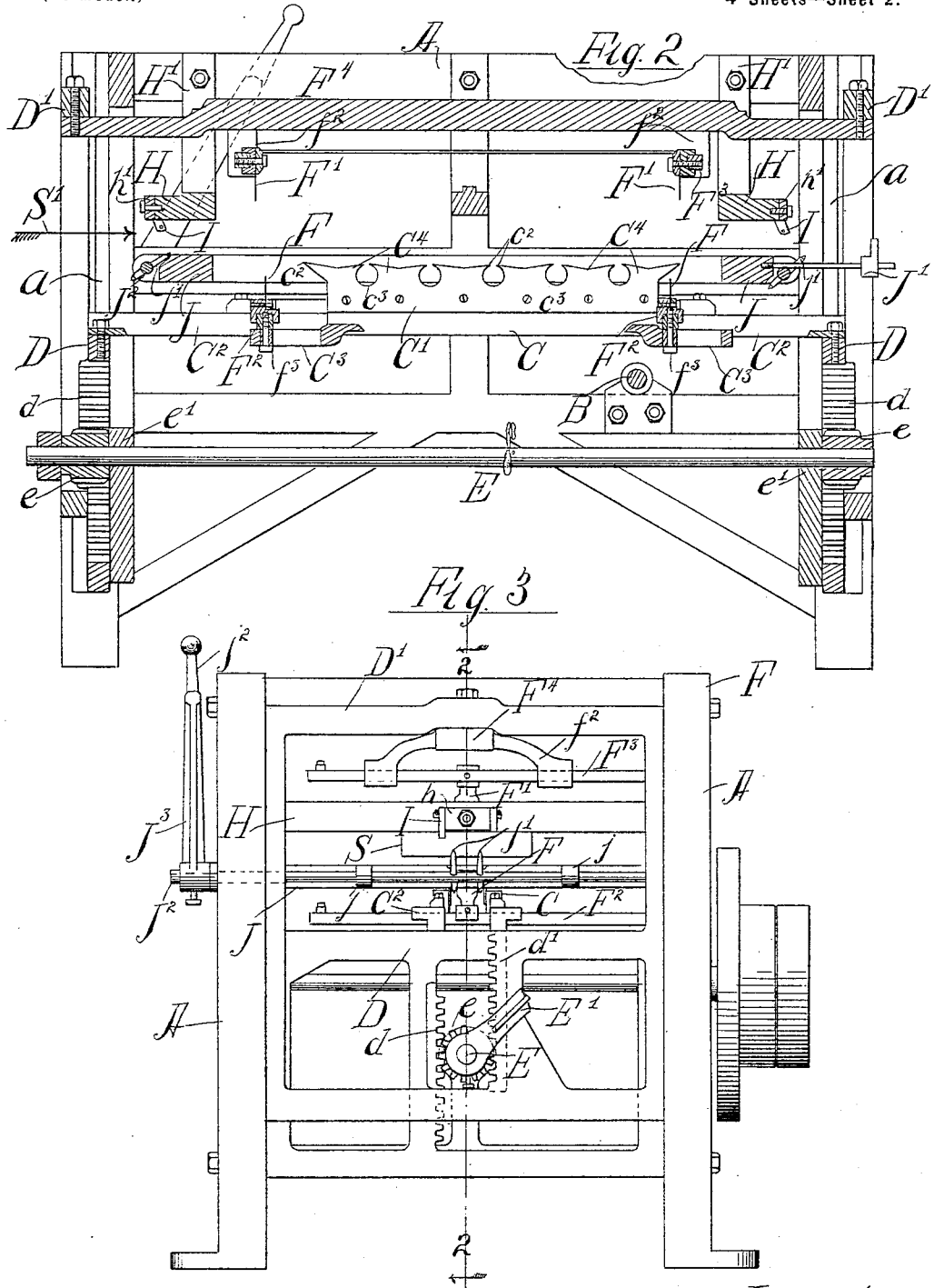

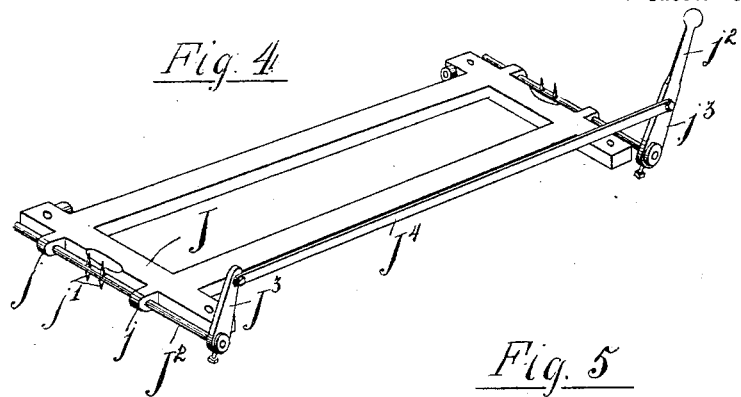
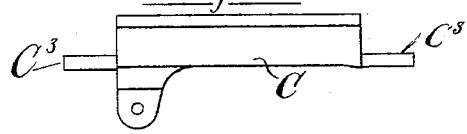
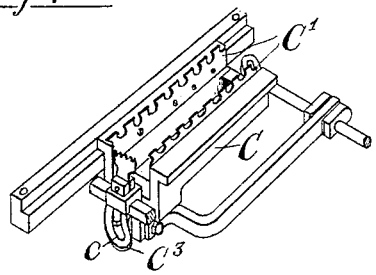
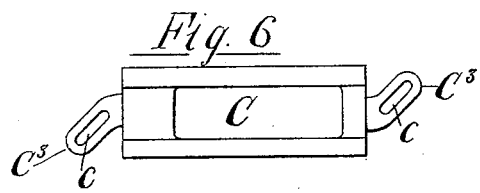
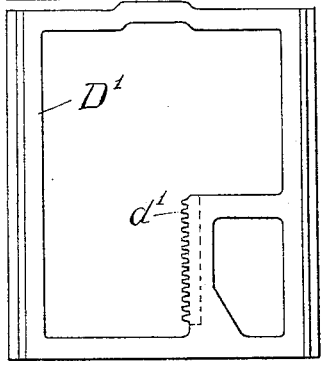
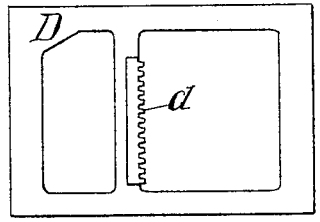

No. 616,352. Patented Dec. 20, 1898.
F. V. PHILLIPS.
MACHINE FOR CUTTING POCKETS IN WINDOW STILES.
(Application filed Jan. 29, 1895.)
(No Model.) 4 Sheets—Sheet 4.
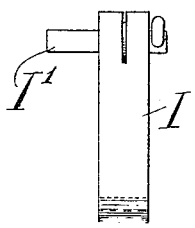
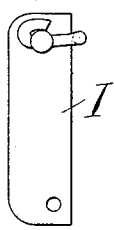
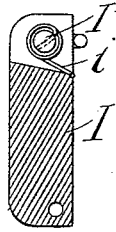
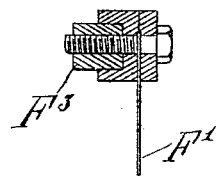
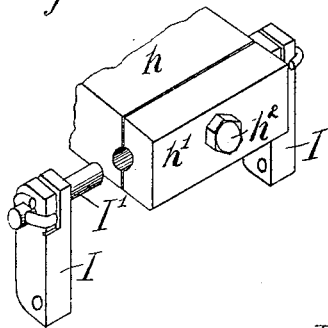
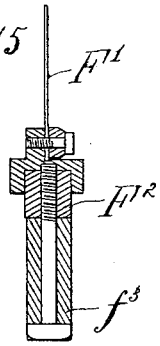
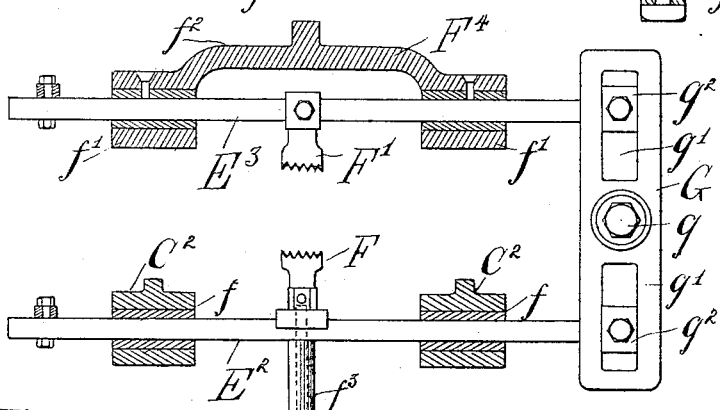
Witnesses
Inventor
Francis V. Phillips
by Dayton, Poole & Brown,
his Attorneys

UNITED STATES PATENT OFFICE.

FRANCIS V. PHILLIPS, OF CHICAGO, ILLINOIS, ASSIGNOR TO THE SMITH & PHILLIPS MANUFACTURING COMPANY, OF SAME PLACE.

MACHINE FOR CUTTING POCKETS IN WINDOW-STILES.

SPECIFICATION forming part of Letters Patent No. 616,352, dated December 20, 1898.

Application filed January 29, 1895. Serial No. 536,611. (No model.)

*To all whom it may concern:*

Be it known that I, FRANCIS V. PHILLIPS, of Chicago, in the county of Cook and State of Illinois, have invented certain new and useful Improvements in Machines for Cutting Pockets in Window-Stiles; and I do hereby declare that the following is a full, clear, and exact description thereof, reference being had to the accompanying drawings, and to the letters of reference marked thereon, which form a part of this specification.

This invention has among its objects to provide certain new features in machines in which grooved window-frames and the like are gaged, guided, or held while being operated upon by the machine, and also to provide certain improvements in machines for cutting pockets in window-frames, the class or kind of machines in which these general improvements are applied being set forth in the application for patent, Serial No. 445,959, filed by me September 15, 1892, and since issued as Patent No. 548,454.

In the accompanying drawings, which illustrate my present invention and improvements, Figure 1 is a perspective of a machine for cutting the pockets in window-frames. Fig. 2 is a central vertical longitudinal section thereof in the line 2 2 of Fig. 3. Fig. 3 is an end view of the machine, representing that end of the machine which is in view in Fig. 1. The remaining figures of the drawings are details showing the various parts of the machine in various views, excepting Fig. 20, which illustrates the kind of window-frame pocket the machine is intended to cut.

The machine shown in these drawings is intended and adapted to make the parallel side cuts and the transverse end cuts by which the pocket illustrated and described in Letters Patent No. 483,968, granted to me on the 4th day of October, 1892, may be simultaneously made and in which the pocket-piece is finally severed from the window-frame by breaking the wood lengthwise of the grain and substantially parallel with the faces of the frame-stile between the offset transverse end cuts.

A represents the frame of the machine, which in the construction herein shown is of rectangular form. In this frame and transversely thereto is arranged the continuously-rotating driving-shaft B.

C is a horizontally-arranged longitudinally-reciprocating frame carrying parallel saws $C'$ $C'$, the said frame and saws being shown detached and in side view in Fig. 5, detached and in plan view in Fig. 6, in perspective in Fig. 7, and in place in Figs. 2 and 3. Said saw-frame C is mounted to slide upon fixed longitudinal bars $C^2$ $C^2$, appropriately supported at their ends in vertically-sliding frames D D, arranged at opposite ends of the machine, one of said sliding frames D being shown detached in Fig. 9. Said frames D slide in appropriate grooves $a$ $a$ in the uprights of the main frame A, as sufficiently indicated in Fig. 2. Each of the sliding frames D is provided with a rack $d$, and with these racks engage pinions $e$ $e$, rigidly secured to a longitudinal shaft E, that has fixed bearings at $e'$ in the cross-bars of the main frame A and is provided with a hand-lever $E'$, by which said pinions may be rotated and the frames D D, with the saws $C'$ $C'$, raised and lowered at pleasure.

F F represent the transversely-reciprocating saws or cutters which make the transverse cuts on the under or back side of the window-frame stile, and $F'$ $F'$ are similar cutters which make the similar cuts in the upper surface of the stile. These cutters F and $F'$ are here shown as being mounted on rectangular bars $F^2$ $F^3$, as seen in Fig. 13, the bar $F^2$ carrying the cutter F and the bar $F^3$ carrying the cutter $F'$ at each end of the pocket. The bar $F^2$ is arranged to slide in bearings $f$ in the parallel bars $C^2$ of the frame which carries the saws $C'$, so that when the saws $C'$ are raised the cutters F also ascend. The bars $F^3$ are mounted to reciprocate in bearings $f'$ in brackets $f^2$, secured to a longitudinally-arranged bar $F^4$. This bar $F^4$ is connected at its ends to the upper cross-piece of vertically-sliding frames $D'$, fitted to rise and fall in the end uprights of the main frame alongside the vertically-sliding frames D. One of the frames $D'$ is shown detached in Fig. 8, and, as indicated in said Fig. 8 and also in Figs. 1 and 3, each of said frames D' is provided with a rack $d'$, which engages with the adjacent pinion $e$ on the shaft E, but on the opposite side of said pinion from the rack $d$ that belongs to the sliding frame D. When the shaft E and pinions $e$ are oscillated by the lever E' to raise the saws C' and transverse cutters F, the cutters F' are simultaneously lowered, and vice versa. Inasmuch as the longitudinal saws C' are called on to cut entirely through the window-frame stile while the saws or cutters F and F' each cut only part way through from opposite sides, the lower cutters F F are adjusted below the saws C', so that a movement of the latter which will carry them entirely through the stile will carry the cutters F only part way through said stile. Correspondingly the cutters F' are adjusted in position to strike and to begin to cut into the upper surface of the stile only when the saws C' shall have cut part way through said stile. Usually the cutters F F' are made to cut to the plane of the bottom of the stop-groove in the stile.

The cutters F F' are reciprocated transversely to the direction of movement of the saws C' by the provision of the obliquely-slotted projections $C^3$ at the ends of the saw-frame C, into the slots $c$ of which projections depend the studs $f^3$, which are attached to the bars $F^2$ of the lower cross-cutters F. Reciprocating motion is imparted to the upper bars $F^3$ from the lower bars $F^2$ through the medium of centrally-pivoted levers G G, one of which is distinctly shown in Fig. 13. Each of said levers G is mounted to vibrate upon a centrally-fixed pivot $g$, connecting suitably with the main frame, and is provided with slots $g'$ $g'$, in each of which works a sliding block $g^2$, having pivotal connection with the adjacent reciprocating saw-bars $F^2$ $F^3$, as also plainly shown in Fig. 13. The reciprocation of the saw-bar $F^2$ therefore communicates vibratory movement to the slotted and centrally-pivoted lever G, which in turn communicates reciprocating motion in opposite directions to the saw-bar $F^3$, and the length of the reciprocatory movement or the throw of the cutters F and F' is preserved uniform through a variation in the vibratory throw of the lever G, due to the movement of the slides $g^2$ $g^2$ toward or from its central pivot.

A new feature of my present invention consists in the provision of a guide for a stile having a stop-groove therein. As those acquainted with the use of my machine as set forth in my said prior patent are aware, the window-stile is provided with a stop-groove before the pocket is cut therein and the pocket necessarily bears a definite relation to the said stop-groove, as it must do to the stop inserted in said groove when the window-frame is finished. It is also well known that window-stiles are not accurately of the same width and that if gaged or guided as to their position in the machine by their edges the pocket is liable to be inaccurately situated with reference to the stop or stop-groove. I have therefore devised a guide or gage adapted to enter and engage the groove instead of engaging either edge of the stile. As window-frame stiles are rights and lefts, however, two of these groove-engaging guides are provided at a proper distance apart, and they are adapted to be alternately used or disused by giving movability to said guides or gages, by which one may be retracted while the other acts.

As applied to this particular machine the guide or gaging device last referred to is seen in place in the machine in Figs. 1 and 3 of the drawings and detached and in detail in Figs. 16, 17, 18, and 19. In the construction here shown H H, Figs. 2 and 3, are cross-bars arranged one near each end of the machine, against which the upper planed surface of the window-stile bears when the latter is being operated upon. Connected with each of these cross-bars H H are two depending gages I I, pivoted or otherwise made movable, so that they may be raised and lowered. As here illustrated they depend from opposite sides of a rectangular projection $h$ belonging to the cross-bars H, and, as better shown in Figs. 16 and 19, each is mounted to vibrate on a separate short stud or pivot I', which is clamped to the fixed projection $h$ by means of a clamping-cap $h'$ and bolt $h^2$, Fig. 16. This permits the gages to be readily replaced by others of different widths to fit the stop-grooves of different frame-stiles. There being but one stop-groove in each frame-stile, when the stile is shoved into the machine lengthwise from one end of the machine the proper one of the adjacent gages I is allowed to enter the groove and the other gage of each pair is pushed upward and rides upon the ungrooved surface of the stile. One of the gages I at each end of the machine will therefore be brought into use in cutting the pocket of a right-hand stile and the opposite gage will be similarly brought into use in cutting the pocket of a left-hand stile.

As illustrated in Figs. 16 to 19, inclusive, of the drawings, the gages I are thrown or held down by means of springs $i$, acting in aid of their gravity. It is manifest that in the depending arrangement of said gages, here illustrated in a machine in which the frame-stile occupies a horizontal plane, a construction or form of said gages in which gravity will be sufficient for their depression may be easily made, and it is to be understood that either gravity or a spring, or both, may be used, as preferred. It is also to be understood that the gages for entering the stop-groove of the frame-stile and gaging the position of the stile in the machine for any purpose being new I do not limit myself to the form or movement of such gages, their form and movement being manifestly variable without in any way modifying their essential function in the machine.

The cross-bars H H are desirably suspended from brackets H', which are adjustably secured to the main frame of the machine, as seen clearly in Fig. 2.

J is a frame which is of the rectangular centrally-open form shown in the detached Fig. 4 and in longitudinal section in Fig. 2. The frame-stile is inserted into the machine lengthwise above the frame J and below the cross-bars H, and the saws C' and F work upwardly through the central open space of said frame J into the stile, as indicated in Figs. 2 and 3, S in Fig. 3 indicating the frame-stile secured in position in the machine preparatory to operating the saws. J', Fig. 2, is a horizontally-adjustable stop against which the end of the frame-stile may be pushed in putting it into the machine. Said stop J' is not a necessity, since precisely accurate location of the stile-pocket is not important.

At each end of the frame J and in projecting lugs $j$ thereon (best seen in Fig. 4) is mounted a rod $J^2$, in which and beneath the middle of the window-stile are secured pointed spurs $j'$. The rods $j^2$ by an oscillatory movement thereof may throw these spurs $j'$ into the inclined position shown in Fig. 2 in order to permit the ready insertion of the window-stile and by a reverse movement may bring the spurs upward against and into the under or back side of the window-stile both to press it firmly against the cross-bars H and to secure it fixedly in place while the saws or cutters C', F, and F' are at work. The two spur-carrying rods $J^2$ are oscillated simultaneously by means of the levers $J^3$ $J^3$, connected by the rod $J^4$, one of said levers being prolonged to give a handhold $j^2$, as indicated in Figs. 2 and 4.

The spurs $j'$ may project unequally on opposite sides of the rod $J^2$, as indicated in Figs. 2 and 4, so that by readjusting the rods $J^2$ in the levers $J^3$ to bring the opposite ends of the spurs uppermost the same double-pointed spurs may be made to serve for stiles of different thicknesses.

A stop or stops—as, for example, shown at $j^3$ in Fig. 1—should be provided in some suitable place to limit the throw of said levers and the oscillation of the rods $J^2$, said stop $j^3$ being shown in position to engage with the connecting-rod $J^4$ for this purpose.

The use of the spurs mounted in oscillating rods $J^2$ as a means for engaging and holding the window-stile to the superposed cross-bars H results in a retraction of the frame-stile backwardly from the end stop J', (when the latter is employed,) and said stop should, therefore, be placed correspondingly farther back than the desired position of the stile when being cut. Spurs may manifestly be otherwise mounted to press upwardly and into the back or under side of the frame-stile, and change in this particular is also not to be regarded as a departure from this part of my invention.

The longitudinal cutters C, above designated "saws," are more properly chisels or plows, being provided with teeth $C^4$, which have chisel edges $c^2$, half of said edges being directed toward one end of the cutter and the other half toward the other end. These teeth have no set; but the plate of which each of these cutters is made is desirably thicker at the edges of the teeth than at the back or bottom edge of the plate to give desired clearance. The teeth $C^4$, each having two oppositely-directed cutting edges $c^2$, as shown, are separated by deep recesses $c^3$ to allow passage for and to receive the shavings produced by the cutting edges—that is to say, the shavings pass out through these recesses during the first part of work of the cutters and accumulate therein during the remainder of the work, falling out readily when the cutter is withdrawn from the kerf after the pocket has been cut. This construction of the saws or cutters C', adapted especially for plowing lengthwise of the grain of the window-stile, is believed to be new in woodworking-machines.

The saws or cutters C' have their end plows or points $c^2$ constructed, as shown, to project over and clear of the lower cross-cutters F and reach the planes of the upper cutters F' in order that the pocket-pieces may be laterally severed entirely from the stile, leaving nothing to be done to wholly detach the pocket-piece except to break the wood midway of the thickness of the stile between the bottoms of the cuts produced by the cross-cutters F F'.

The operation of the machine thus described is readily understood. A frame-stile is thrust into the machine endwise in the direction indicated by the arrow S' applied to Fig. 2, with the stop-groove in said stile in line with the proper one of the adjacent gages I, so that said gage and the corresponding one at the opposite end of the machine will enter and occupy said stop-groove. The hand-lever $J^3$ is then thrown to bring the spurs $j'$ upwardly against and into the under surface of the stile, forcing the latter firmly against the under surface of the cross-bars H and holding it rigidly in position. The saws being continuously in motion, the hand-lever E' is then operated to raise the sliding frames D and the lower saws C' and F and at the same time to depress the sliding frames D' and the upper saws F'. The adjustment of the cross-bars H H being such that the saws F and F' will each pass to the plane of the bottom of the stop-groove in the stile at the time the saws C' will have passed through it the pocket will have been cut on all sides while yet being retained integrally with the stile at the points between the bottoms of the several end cuts thus produced.

Detail construction of the end slides D and D' and of their sliding engagement with each other and with the uprights of the main frame are shown in Figs. 10, 11, and 12, in which the frame D has bearing on all sides in the said uprights, while the frame D' has bearing on two sides with surfaces of the frame D and on one side only with a surface of the said uprights of the main frame. This is a convenient and desirable, though not a necessary, construction.

In Figs. 14 and 15 are shown details of construction in devices relating to the attachment of the cross-cutters F and F' and including a mode of connecting the studs $f^3$ with the lower reciprocating bar $F^2$. These are shown as convenient and desirable constructions; but they also may be varied without departure from my invention.

It will be observed that in my former patent first hereinabove referred to the cross-cutters which sever or form the ends of the pocket are shown inclined to the plane of the window-stile, producing beveled end surfaces of the pocket and of its filling-piece, while in the machine as here shown these cutters are in planes at right angles to the surfaces of the window-stile. The latter construction of the machine and of the pocket is now believed to be the better, though the inclined arrangement of the cutters may be herein employed, if preferred.

It is to be understood that in this machine, as in that described in my aforesaid prior patent, the cutters which make the cross-cut at the end of the pocket are not necessarily toothed and in the specific form of saws.

I claim as my invention—

1. In a machine for cutting pockets in a window-frame stile having a longitudinal stop-groove, the combination with a pocket cutter or cutters, a support against which the grooved face of the window-stile bears, and means for pressing the stile against said support, of a laterally-immovable gage adapted to enter the stop-groove on the stile for the purpose of insuring the proper position of the pocket with relation to said stop-groove.

2. In a machine for cutting right and left window-frame stiles, the combination with cutting devices of two separately and independently movable gages located on opposite sides of the median line of the stile when in position in the machine, each adapted to separately enter the stop-groove in said stile and be retracted therefrom, whereby one of said gages will be brought into operation upon the right-hand and the other upon the left-hand stile, the other gage in each case being retracted out of the way.

3. In a machine for cutting right and left window-frame stiles, the combination with cutting devices of two movable gages located on opposite sides of the median line of the stile when in position in the machine, each adapted to enter the stop-groove in said stile, and means for automatically advancing each of said gages into said groove, said gages being separately and independently movable, whereby one of the same may be brought into operation upon the right-hand and the other upon the left-hand stile, the other gage in each case being retracted out of the way.

4. In a machine for cutting window-frame stiles, the combination with cutting devices, a support against which the grooved face of the window-stile bears, and means for pressing the stile against the support, of two separately-movable gages located on opposite sides of said support, each adapted to separately enter the stop-groove in said window-stile and be retracted therefrom, whereby either a right or left hand stile may be inserted into the machine and gaged by the appropriate one of the two gages to insure action of the cutting devices at the proper place in the stile, the other gage in each case being retracted out of the way.

5. In a window-stile-cutting machine, the combination, with suitable rest and with means for gaging the window-stile by the stop-groove therein, of movable spurs adapted to be thrust against and into the back surface of the window-stile in forcing the latter against the rest.

6. In a machine for sawing pockets in a window-stile, employing parallel, reciprocating saws for cutting the sides of the pocket, and transverse, offset cutters for cutting the ends of the pocket from opposite sides of the stile, the combination, with driving connections giving reciprocatory motion to the longitudinal saws, of a frame carrying said longitudinal saws provided with inclined slots, sliding bars for carrying the lower transverse cutters and engaged with said slots, centrally pivoted levers provided with slots engaged with said lower cutter-bars and also with similar upper cutter-bars, whereby uniform motion is communicated from the main saw frame to both sets of cross-cutters.

7. In a machine for cutting window-stile pockets, the combination with the main frame, of vertically-guided sliding frames, as D D', provided with racks, interposed pinions mounted rigidly upon a revoluble shaft having a lever, longitudinal and transverse cutters carried by one pair of said sliding frames, transverse cutters carried by the other pair of said sliding frames, and means for holding the stile in fixed position between the upper and lower cutters.

8. In a machine for simultaneously cutting the four sides of a window-stile pocket, and comprising two cross-cutters operating from each side of the stile and the pair at one side being at a less distance apart than those at the opposite side, whereby the end or cross cuts at each end of the pocket are made in different planes, the combination, with said offset end or cross cutters, of side cutters ar ranged to work from the same side of the stile with the two cross-cutters which are nearest each other, and provided with cutting-points at their extremities which work over and clear of said cross-cutters, substantially as shown and described.

In testimony that I claim the foregoing as my invention I affix my signature in presence of two witnesses.

FRANCIS V. PHILLIPS.

Witnesses:
M. E. DAYTON,
ALBERT H. GRAVES.